Jan. 8, 1957  C. E. ATKINS  2,777,097
PHOTOELECTRIC CIRCUIT
Filed May 5, 1955  2 Sheets-Sheet 1
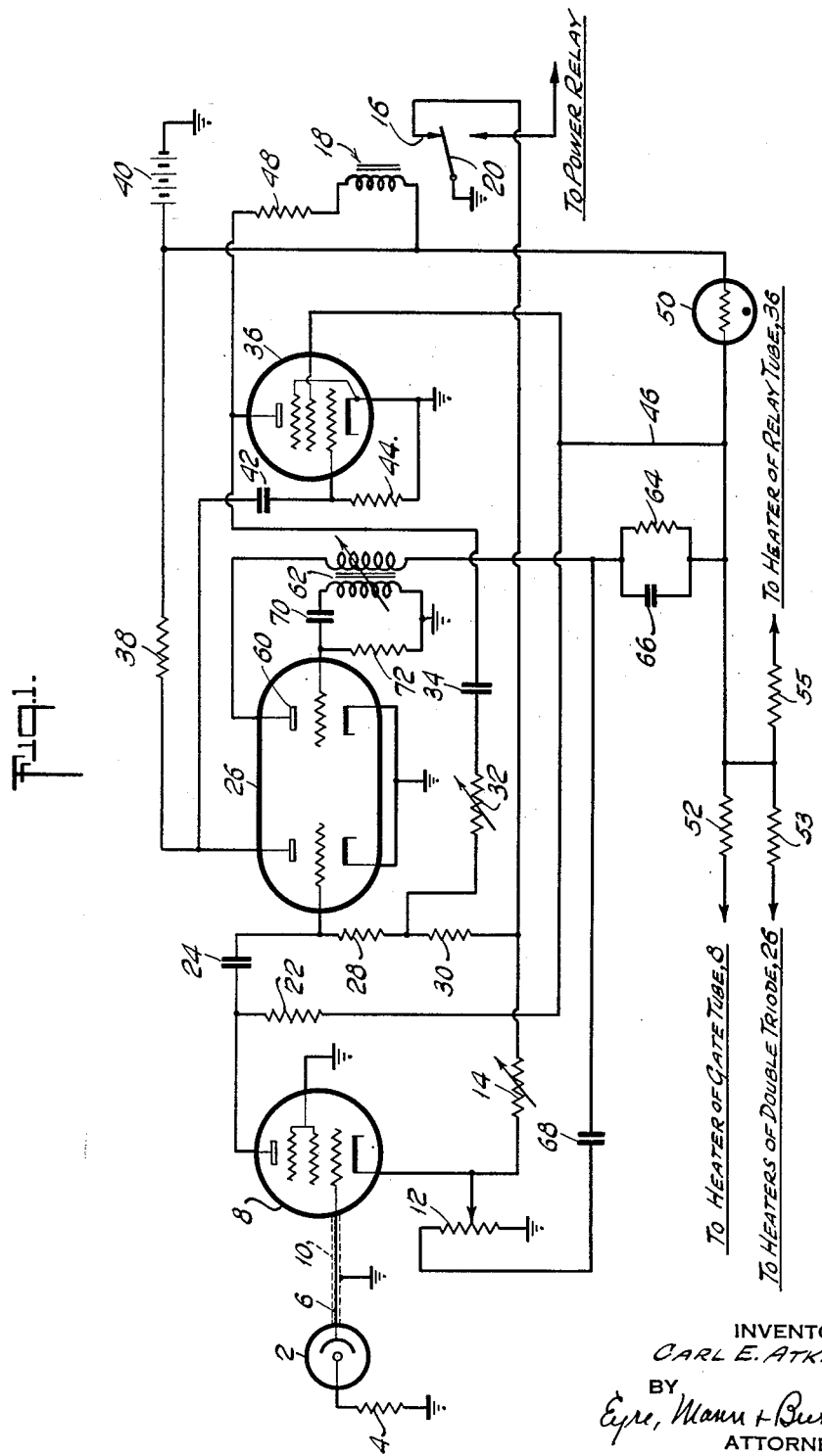
INVENTOR
CARL E. ATKINS
BY
Eyre, Mann + Burrows
ATTORNEYS

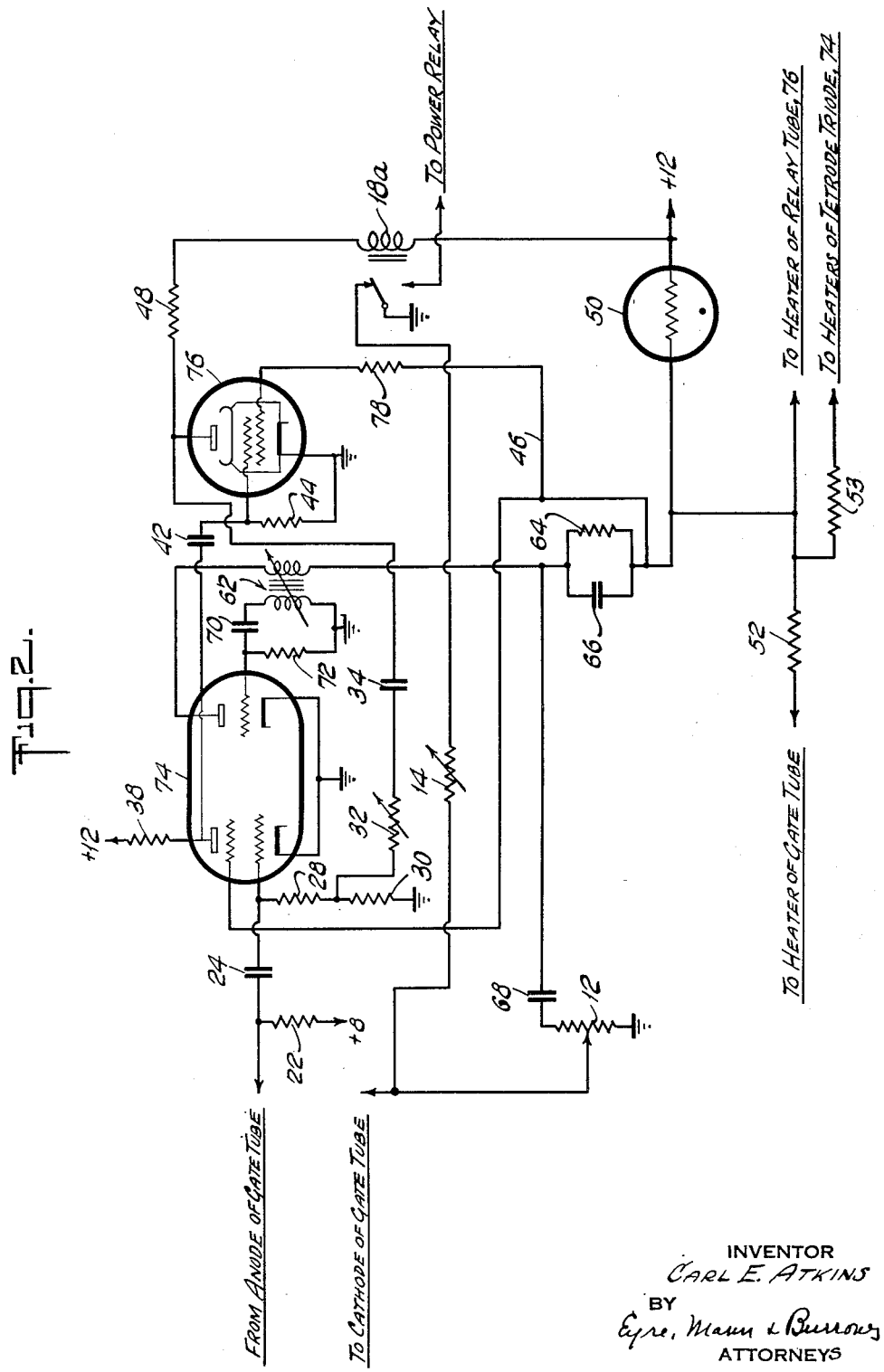

United States Patent Office 2,777,097
Patented Jan. 8, 1957

2,777,097

PHOTOELECTRIC CIRCUIT

Carl E. Atkins, Bloomfield, N. J., assignor to Tung-Sol Electric Inc., a corporation of Delaware Application May 5, 1955, Serial No. 506,217

10 Claims. (Cl. 317—130)

The present invention relates to photoelectric control circuits and comprises a novel circuit of this type employing as the light responsive device a simple two-electrode photoelectric tube. The circuit of the present application is of the type of that disclosed and claimed in my copending applications Serial No. 326,809 filed December 19, 1952, U. S. Patent No. 2,730,629, entitled "Low Voltage Photoelectric Control Circuit" and Serial No. 375,236 filed August 19, 1953 entitled "Light Responsive Circuit," which latter application is a continuation-in-part of my prior application Serial No. 297,946 filed July 9, 1952 and now abandoned. The present circuit, like those of the said other applications, includes means for creating voltage pulses which vary in magnitude with the amount of photoelectric current accumulated between pulses and means for amplifying such pulses for control of a relay or the like.

The present circuit, like that specifically disclosed and claimed in Serial No. 326,809, is adapted to operate on low voltage of the order obtainable from car-carried storage batteries. As compared to the circuit of that application, the present circuit utilizes fewer and less expensive elements without sacrifice of, and in fact with improvement in, the overall operation of the system. More specifically, in the present circuit three electronic tubes replace five such tubes of the earlier circuit with resulting economy in cost, not only of the electronic tubes, but also of circuit elements associated therewith and resulting also in saving of space requirements.

The new circuit, like the earlier circuits, includes a gating tube connected to the photoelectric tube and to accumulating means, electronic means for applying keying to the gating tube and amplifying means for amplifying pulses appearing at the anode of the gating tube which pulses vary in magnitude as a function of the charge on the accumulating means. The new circuit includes novel means for creating the keying pulses and for adjusting the sensitivity of the circuit. A feature of the preferred embodiment of the present invention permitting use of a less sensitive and therefore cheaper relay is the provision of a novel type of double tube, one-half of which is a tetrode connected for operation as an amplifier and the other half of which forms part of an oscillatory circuit for providing the keying pulses to the gating tube.

For a better understanding of the invention, reference may be had to the accompanying drawings of which:

Fig. 1 is a schematic diagram of a circuit embodying the invention; and

Fig. 2 is a schematic circuit diagram illustrating an alternative arrangement of a portion of the circuit of Fig. 1.

In Fig. 1, to which reference may now be had, the photoelectric tube 2 which will be positioned so that the light from the headlamps of oncoming automobiles will reach the photocathode, is shown with its anode connected through a 40 megohm resistor 4 to ground and its cathode connected by a lead 6 to the No. 1 grid of a pentode 8 comprising the gate tube. The lead 6 is shielded by a grounded cable 10 which with the connection 6 serves as part of the accumulating means of the circuit, the inherent capacity between the photocathode and anode of the tube 4 and between the No. 1 grid and the other electrodes of the gate tube 8 comprising the remainder of the accumulating means. The gate tube 8 is normally biased to be non-conductive by virtue of a connection between the cathode of the tube and a tap on a resistor 12, one end of which is grounded to serve as a cathode resistor. The cathode of the gate tube 8 is also connected through a variable resistor 14 and a front contact 16 of a relay 18 to ground when the relay is energized, the armature 20 of the relay being grounded. The screen grid and suppressor grid of the pentode 8 are connected together and to ground. The tube 8 is a beam-type tube, such as a 6AK6. The anode of tube 8 is connected through a load resistor 22 of substantial magnitude, for example, 22 megohms, to a point of the circuit maintained at substantially 8 volts. The anode of the tube 8 is also connected through a condenser 24 to the control grid of the first half of a double triode which may be a 12AU7. The control grid of this half of the double triode is connected to ground through series connected resistors 28 and 30 and the junction of these resistors is connected through a series circuit comprising a high resistor 32 and condenser 34 to the anode of a relay tube 36 for a purpose hereinafter to be described. The anode of the first half of the double triode 26 is connected through a load resistor 38 to the positive terminal of a storage battery 40, the battery being of the order of 12 or 13 volts. The anode of the first half of the double triode is also connected through a condenser 42 to the control grid of the relay tube 36. A high grid bias resistor 44 is provided for the control grid of the relay tube. The relay tube 36 in this embodiment of the invention is a pentode such as a 6AS5. The screen grid of the pentode is connected to the circuit at a point of substantially 8 volts by a lead 46 and the cathode of the tube is grounded. The anode of the relay tube is connected through a small resistor 48 of the order of 100 ohms and the winding of the relay 18 to the positive terminal of the battery 40. Regulated voltage of the order of 8 volts for the screen grid of the relay tube 36 and for the anode of the gate tube 8 is obtained from the battery 40 by means of a ballast tube 50 one terminal of which is connected to the positive terminal of the battery 40 and the other terminal of which is connected to the lead 46. The cathodes of the double triode and of the relay tube are grounded. The heaters for the various tubes are energized from the regulated voltage appearing at the output of the ballast tube 50, the heater of the gate tube being connected to the ballast tube through a small resistor 52 of about 15 ohms and the heaters of the double triode being connected in parallel and through a resistor 53 to the ballast tube 50. The heater for the relay tube 36 is connected through a resistor 55 to the ballast tube.

The part of the circuit now to be described provides the keying pulses for intermittently negatively pulsing the cathode of the gate tube to permit conduction through the tube in accordance with the condition of charge of the accumulating means. The second half of the triode 26 forms part of an oscillatory circuit. For this purpose the anode 60 of the double triode is connected through one winding of a small iron core transformer 62 to the lead 46 through a load resistor 64 by-passed for the high frequency currents by a condenser 66. Anode 60 is also connected through the winding of the transformer 62 and through a condenser 68 of small capacity to the ungrounded end of the resistor 12. The other winding of the transformer 62 has one end connected through a condenser 70 to the grid of the second half of the double triode and its other end connected to the grounded end of a grid bias resistor 72. The transformer 62 is of the adjustable type being provided with a movable core for manual adjustment of the mutual inductance of the transformer. The above described oscillatory circuit will intermittently break into high frequency oscillation, the condenser 70 when charged blocking the tube and stopping the oscillations which then break out again after discharge of the condenser through the bias resistor 72. The intermittent bursts of oscillation, because of the connection to the resistor 12, part of which is in the cathode circuit of the gate tube 8, will intermittently key the gate tube by impressing negative pulses on the cathode. When the cathode is negatively pulsed, the current flow through the gate tube 8 will depend upon the condition of charge of the accumulating means comprising the conductor 6 and grounded shield 10 associated therewith. If no light is incident on the photocathode, the control grid and accumulating means associated therewith will be quickly charged negatively by the electrons flowing from the cathode at the moment of pulsation, so that after a few negative pulses the gate tube will be blocked. Under these conditions the relay tube 36 will continue to pass current, holding the relay energized and holding open at the back contact of the relay the circuit of a power relay (not shown). When the photoelectric tube 2 is rendered conductive because of light falling on the photocathode, part or all of the negative charge accumulated in the cable capacitance will leak off during intervals between successive applications of negative pulses to the cathode of the gate tube and accordingly current will flow through the gate tube at each pulse, the magnitude of the current being determined by the state of charge of the accumulating means. Negative pulses of a magnitude varying as a function of the intensity of light on the photocathode will thus appear at the anode of the gate tube and be impressed upon the control grid of the first half of the double triode 26. Amplified positive pulses originating at the anode of the first half of the triode will be impressed upon the grid of the relay tube causing momentary increase in current through the relay tube and subsequent decrease in current as the electrons received by the control grid from the cathode during the momentary increase in current leak off through the high grid resistor 44. When the control grid of the relay tube is forced sufficiently negative, relay 18 will release, closing the circuit to the power relay and simultaneously opening the circuit connecting the cathode of the gate tube to ground through resistor 14. This increase in cathode resistance increases the sensitivity of the circuit and insures that the relay will not reenergize when the lights of the approaching car are dimmed.

To insure rapid release of the power relay and consequent restoration of high beam conditions when light ceases to fall on the photocathode of tube 2, the positive feedback connection heretofore described comprising the resistor 32 and condenser 34 connected between the anode of the relay tube and the junction of the grid bias resistors 28 and 30 is provided. After release of the relay 18 when the current through the relay tube begins to increase, the potential at the anode of the relay tube will decrease and the potential of the control grid of the amplifier half of the double triode will be correspondingly lower, thus hastening pick-up of the relay.

It will be noted that the anode of the photoelectric tube 2 is connected to ground through a high resistor and that no connection is provided to the high potential source. This arrangement not only conserves battery power, but also insures that the control grid of the gate tube will never go positive. In actual practice the potential of the control grid varies from about minus .9 to minus 1.0 volts when the gate tube is connected in a circuit such as that of Fig. 1. The grounding of the screen and suppressor grids of the beam-type gate tube is of value in insuring that false signals will not appear at the anode of the tube. In a beam-type tube when there is a reduction in cathode potential or an increase in control grid potential, the screen grid, if positively biased, draws a disproportionate amount of the resulting increased current through the tube with the result that the current drawn by the plate may actually decrease. Such result is avoided by the described grounding of the screen grid. This feature, except in combination with other elements of the circuit is not claimed herein as it forms the subject matter of claims in my aforesaid application Serial No. 375,236, filed August 19, 1953.

It will be apparent that the circuit of Fig. 1 can be economically produced because in addition to the ballast tube and photoelectric tube only three electronic tubes, the gate tube 8, the double triode 26 and the relay tube 36 are required. The small transformer 60 can be obtained relatively cheaply. The adjustable core of the transformer provides the means for adjustment of the sensitivity of the circuit, as change of vigor of oscillation of the circuit changes the frequency and amplitude of the keying pulses and therefore the relation between the intensity of incident light and magnitude of negative pulses appearing at the anode of the gating tube. For this reason the resistor 12, adjustment of the position of the tap on which would ordinarily serve this purpose, need not be made adjustable, and thereby a cheaper type of resistor may be employed. By utilizing one-half of a double triode as part of an oscillatory circuit for providing keying pulses to the gate tube a separate circuit such as a multivibrator circuit which is used for this purpose in the circuit of the said copending application Serial No. 326,809, can be dispensed with. In the circuit of the last mentioned copending application, five electronic tubes, of which two are double triodes are provided, in addition to a ballast tube and a photoelectric tube. The saving effected by the present circuit will be readily apparent to those skilled in the art.

When the double triode of the circuit of Fig. 1 is replaced by a special double tube, the first half of which is a tetrode, and the second half a triode, further saving may be effected because in such case the amplifying portion of the double tube, the tetrode, develops sufficient power to permit the use of a space-charge-grid type tube as the relay tube and this in turn permits the use of a less sensitive and therefore cheaper type of relay. In Fig. 2, to which reference may now be had, certain parts of the circuit which are identical with that of Fig. 1, have been omitted and appropriate legends applied to indicate the connection to the non-illustrated elements of the circuit. The special tetrode-triode used in this embodiment of the invention is indicated by the reference numeral 74. The first, or amplifying half of the tetrode triode, has its control grid connected through the condenser 24 to the anode of the gate tube and has its control grid connected to ground through the bias resistors 28 and 30 as in the case of the amplifying half of the double triode 26 of Fig. 1. The screen grid of the tetrode is connected to the lead 46 for application of positive potential thereto and the anode of the tetrode is connected to the positive terminal of the battery 40 through the load resistor 38 and to the signal grid (grid No. 2) of a relay tube 76 through the condenser 42. The signal grid of tube 76 is provided with the high grid bias resistor 44 and the No. 1 grid of the tube is connected through a small resistor 78 to the lead 46. Relay tube 76 may be a 28D7 of Sylvania Electric Products Inc. but with a 12 volt rather than a 28 volt, heater. Preferably, however, in order to minimize leakage currents between the first grid and the cathode, the tube is a tetrode so constructed that the spacing between the cathode and the inner grid is greater than that between the two grids or than that between the outer grid and the anode. Preferably also, to minimize space charge, the grid turns are relatively staggered. When the relay tube 76 is so constructed, the tube will have high perveance and will be extremely sensitive to change in signal grid potential. It will operate with high current and low plate potential and will cut off upon a small change in signal grid potential.

The second half of the tetrode-triode 74 forms part of the oscillatory circuit heretofore described in connection with Fig. 1. The remaining parts of the circuit of Fig. 2 are identical with the corresponding parts of the circuit of Fig. 1 and are identified by like reference numerals. The relay 18a of Fig. 2, because of the greater current passed by the relay tube 76 may be a less sensitive relay than relay 18 of Fig. 1. If the tube 76 is constructed as above indicated, a one thousand ohm relay may be used in the circuit of Fig. 2 whereas a two thousand ohm relay is required for Fig. 1.

The operation of the circuit of Fig. 2 being substantially identical with that already described in connection with the circuit of Fig. 1, needs no further description. It will be apparent that the tetrode half of the double tube will operate at higher gain than the amplifying portion of the double triode of Fig. 1 and therefore that a larger signal will be impressed upon the grid of the relay tube.

The invention has now been described with reference to two specific embodiments thereof each particularly adapted for automatic control of the headlights of an automobile. The invention is not limited, however, to such specific application as features thereof could obviously be advantageously employed for purposes other than headlight control. Various changes in the particular circuits illustrated in the drawings could be made without departing from the spirit of the invention as defined in the accompanying claims. For example, the accumulating means associated with the photoelectric tube and gate tube could comprise merely the capacity inherent in a connection between the photo-cathode of photo tube and grid of the gate tube when the gate tube and photo tube are mounted within a grounded enclosure, as disclosed in my said application, Serial No. 375,236, filed August 19, 1953.

The following is claimed:

1. A photoelectric control circuit comprising in combination an electronic tube having a cathode, an anode and at least one grid, said cathode being normally biased to render said tube non-conductive, a photoelectric tube having a light sensitive element, current accumulating means coupled to said photoelectric tube and to said grid to impress a potential on the grid varying as a function of condition of charge accumulated thereby, a self-blocking high frequency oscillator coupled to said cathode for intermittently negatively pulsing the same, and alternating current amplifying means for amplifying voltage pulses appearing at the anode of said tube to yield a control signal varying in magnitude as a function of the intensity of light incident on said element.

2. The circuit according to claim 1 wherein said oscillator includes a triode the plate and grid circuits of which are coupled by an adjustable core transformer whereby the vigor of the bursts of oscillations and therefore the frequency and amplitude of the pulses impressed on the cathode of said first mentioned tube may be adjusted for adjustment of the sensitivity of the circuit.

3. The circuit according to claim 2 wherein said amplifying means includes a tetrode, and said triode and tetrode are enclosed within a single envelope.

4. The circuit according to claim 1 including a double triode one half of which forms part of said amplifying means and the other half of which forms part of said oscillator.

5. The circuit according to claim 1 including a regulated source of operating potential for said oscillator and wherein said oscillator comprises a triode having its anode connected to said source through one winding of a transformer and through a potential dropping resistor, its grid connected to ground through a bias resistor and through a series circuit comprising a condenser and the other winding of said transformer, said oscillator being coupled to the cathode of said electronic tube through a series circuit comprising a condenser and a resistor connected between said cathode and the low potential side of said potential dropping resistor.

6. The circuit according to claim 1 including a relay control tube responsive to said amplifying means, an output circuit including a relay the current through said relay decreasing with increase in intensity of light incident on said element, and means responsive to deenergization of said relay for increasing the sensitivity of said circuit, said last mentioned means including a circuit connected to the cathode of said electronic tube which is opened upon release of said relay.

7. A photoelectric control circuit comprising in combination, an electronic tube having a cathode, an anode and at least one grid, said cathode being connected to ground through a resistor for providing normal positive bias thereto, a self-blocking high frequency oscillator connected to said cathode for intermittently pulsing the cathode to permit conduction through said tube, a photoelectric tube having a photocathode, current accumulating means so connected to said photocathode and to the grid of said tube as to be negatively charged from the cathode of said tube when the cathode is pulsed to discharge through said photoelectric tube at a rate dependent upon the intensity of light incident on said photocathode whereby the current through said tube when the cathode is pulsed depends upon the condition of charge of said accumulating means, and alternating current amplifying means for amplifying the voltage pulses appearing at the anode of said tube to yield an alternating current control signal varying in magnitude as a function of light intensity.

8. The circuit according to claim 7 including a double tube one half of which forms part of said amplifying means and the other half forms part of said oscillator, a relay control tube responsive to the output of the amplifying half of said double tube and a relay controlled by said relay control tube.

9. The circuit according to claim 8 wherein said amplifying half of said double tube is a tetrode and said relay control tube is a multi-grid tube having a No. 2 grid connected to said amplifying half of said double tube and a No. 1 grid maintained at a positive potential with respect to the cathode.

10. The circuit according to claim 7 including a relay control tube responsive to the control signal from said amplifying means, an output circuit including a relay coupled to said relay control tube, the current through said relay decreasing with increase in intensity of light incident on said photocathode and a positive feedback connection between the output circuit of said relay tube and said amplifying means for reducing the time of response of said relay control tube to change in intensity of light incident on said photocathode.

No references cited.